United States Patent [19]
Uchino et al.

[11] Patent Number: 4,857,791
[45] Date of Patent: Aug. 15, 1989

[54] LINEAR MOTOR

[75] Inventors: Kenji Uchino, Yokohama; Kazumasa Ohnishi, Nagaoka, both of Japan

[73] Assignees: Nissan Motor CO., Ltd., Yokohama; Alps Electric Co., Ltd., Tokyo, both of Japan

[21] Appl. No.: 201,895

[22] Filed: Jun. 3, 1988

[30] Foreign Application Priority Data

Jun. 5, 1987 [JP] Japan .................................. 62-141017
Dec. 8, 1987 [JP] Japan .................................. 62-310673

[51] Int. Cl.$^4$ ............................................ H01L 41/08
[52] U.S. Cl. ................................... 310/321; 310/323; 310/328; 310/317; 310/12
[58] Field of Search ............................. 310/321-325, 310/328, 317, 12

[56] References Cited
U.S. PATENT DOCUMENTS 4,453,103 6/1984 Vishnevsky et al. ........... 310/328 X
4,714,855 12/1987 Fujimoto ............................. 310/328
4,742,260 5/1988 Shimizu et al. ..................... 310/323

FOREIGN PATENT DOCUMENTS 0138469 10/1981 Japan ................................... 310/328
58-148682 9/1983 Japan .

OTHER PUBLICATIONS

Sonic Power Sounds Off, by McMaster, Reprint from *Steel*, Jun. 26, 1967, (7 pages).
Kuribayashi et al., "Excitation Conditions of Flexural Traveling Waves for a Reversible Ultrasonic Linear Motor", J. Acoust. Soc. Am. 77(4), Apr. 1985, pp. 1431-1435.
Kumada, "A Piezoelectric Ultrasonic Motor," Journal of Applied Physics, vol. 24, (1985), Supplement 24-2, pp. 739-471.
Iwamatsu et al., "Rotary Ultrasonic Motor Using Extensional Vibration of a Ring," Journal of Applied Physics, vol. 25, (1986), Supplement 25-1, pp. 174-176.
Hatsuzawa et al., "Speed Control Characteristics and Digital Servosystem of a Circular Traveling Wave Motor," Rev. Sci. Instrum. 57(11), Nov. 1986, pp. 2886-2889.

*Primary Examiner*—Mark O. Budd
*Attorney, Agent, or Firm*—Foley & Lardner, Schwartz, Jeffery, Schwaab, Mack, Blumenthal & Evans

[57] ABSTRACT

A linear motor is arranged to have two legs each of which have a different resonance frequency, when one of the legs is induced to resonate by applying a vibration having a frequency which corresponds to the resonance frequency of one of the legs, to the chassis of the motor, the motor proceeds in a first direction, while when a vibration having a second frequency which corresponds to the resonance frequency of the other leg is applied, the motor is propelled linearly in the other direction.

7 Claims, 2 Drawing Sheets

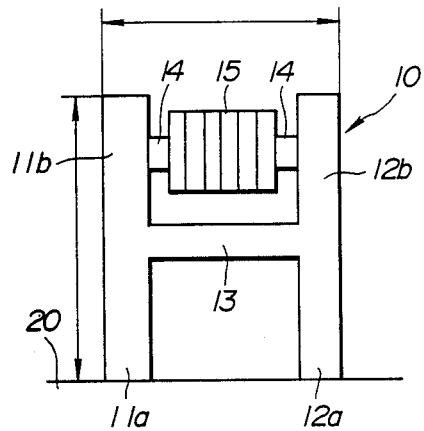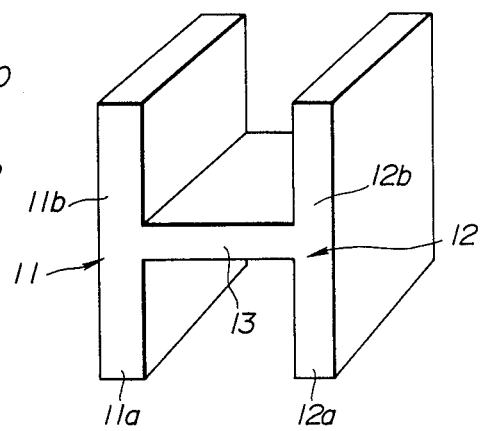
FIG.1  FIG.2
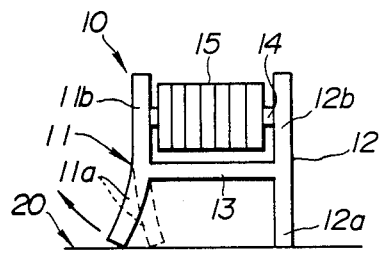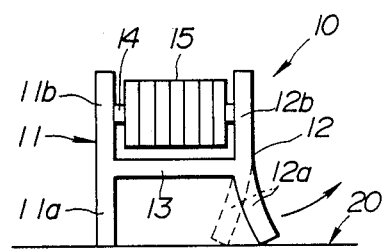
FIG.3(A)  FIG.3(C)
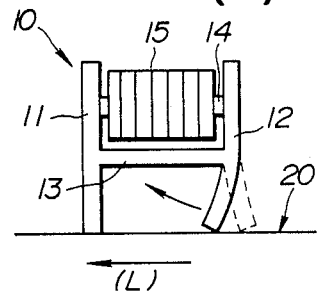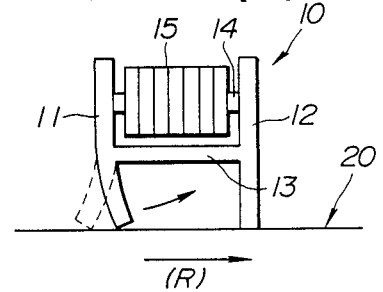
FIG.3(B)  FIG.3(D)

LINEAR MOTOR

BACKGROUND OF THE INVENTION

1. Field of the Invention

The present invention relates to linear motors and more specifically to a linear motor which is driven by a source of ultrasonic or the like vibration.

2. Description of the Prior Art

JP-A-58-148682 discloses an ultrasonic linear motor arrangement wherein a slider rides along a vibrating rail in which a propergating type wave is generated by two or more piezoelectric or the like actuators.

This arrangement however has suffered from the drawbacks the the efficiency of the arrangement is low (in the order of 1-3%) and further in that the construction of the device and the circuit which is used to control the vibration sources are relatively complex.

SUMMARY OF THE INVENTION

It is an object of the present invention to provide a linear motor which is simple in construction and which can be operated by a relatively simple control circuit.

In brief, the above object is achieved by an arrangement wherein a linear motor is arranged to have two legs each of which have a different resonance frequency, when one of the legs is induced to resonate by applying a vibration having a frequency which corresponds to the resonance frequency of one of the legs, to the chassis of the motor, the motor proceeds in a first direction, while when a vibration having a second frequency which corresponds to the resonance frequency of the other leg is applied, the motor is propelled linearly in the other direction.

More specifically, a first aspect of the present invention is deemed to come in a linear motor which features: a chassis, the chassis having first and second leg portions, the first leg portion having a first resonance frequency, the second leg portion having a second resonance frequency which is different from the first one; a vibrator, the vibration being secured to the chassis in a manner to induce the chassis to vibrate when energized, the vibrator being connected to a control circuit and arranged to selectively vibrate the member at first and second frequencies which correspond to the first and second resonance frequencies.

A second aspect of the invention is deemed to come in a method of producing linear motion which features: arranging a first leg of a motor to have a first resonance frequency; arranging a second leg of a motor to have a second resonance frequency which is different from the first resonance frequency; inducing the motor to produce linear motion in a first direction by applying a vibration having a frequency which coincides with the first resonance; and inducing the motor to produce linear motion in second direction by applying vibration having a frequency which coincides with the second resonance frequency.

BRIEF DESCRIPTION OF THE DRAWINGS

FIG. 1 is a side elevation of a first embodiment of the present invention;

FIG. 2 is a perspective view showing the body of the arrangement of FIG. 1;

FIGS. 3A to 3D show the operation of the first embodiment;

DESCRIPTION OF THE PREFERRED EMBODIMENTS

Figure 4:
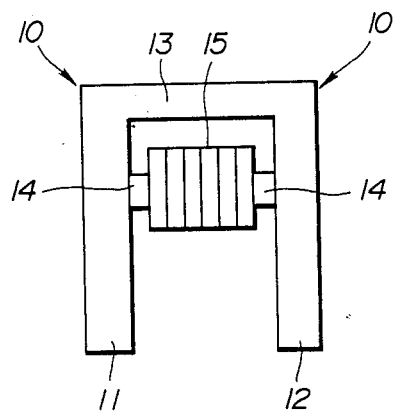
FIGS. 4 and 5 and side elevations showing second and third emodiments respectively of the present invention.

FIGS. 1 and 2 show the construction of a first embodiment of the present invention. In this arrangement a motor arrangement comprises an essentially H-shaped basic constructional member 10. This member includes leg members 11 and 12 and an essentially horizontal connecting or bridge portion 13 which interconnects the legs at essentially their mid-portions. The lower portions of the two legs 11a and 12a are engageable with a surface 20 along which the motor arrangement is arranged to travel (or in the reverse instance is arranged to drive). On the other hand, the upper portions 11b and 12b of the legs are interconnected by way of a spacer 14 and a vibration source such as a piezoelectric or electrostrictive vibrator device 15.

For simplicity of explanation this device will be referred to hereinafter simply as a vibrator. The spacer 14 and the vibrator 15 are secured together and in place by a suitable medium such as epoxy resin or the like.

In this embodiment the chassis of the motor takes the form of a H-shaped member 10. This member is formed of a material which exhibits a predetermined amount of elasticity such as aluminum, brass, stainless steel, steel, ceramic material, glass or a suitable combination of the above mentioned materials. Viz., the member 10 is formed of a material which transmits vibration, is sufficiently elastic and which exhibit appropriate vibrational (acoustic) characteristics.

An important feature of the above arrangement in that the H-shaped member is arranged so that leg 11 has a different resonance characteristic as compared with leg 12. The characteristic can be controlled by adjusting the thickness, width length or the like of the legs. Of course other measures such as providing apertures or the like which change the mass of the legs can also be used without departing from the scope of the present invention. Forming the legs of different materials in order to achieve the desired effect although not deemed particularly practical from the point of efficient production is not outside of the perview of the instant invention.

The vibrator 15 in this instance can be formed of a multi-plate piezo or electrostrictive device which is compiled by suitably arranging single plate elements. The vibrator 15 is operatively connected with a control circuit S (see FIG. 5) and arranged to be responsive to a signal generated thereby.

By way of example only, let it be assumed that the legs 11 and 12 are arranged to that the resonance frequency of leg 11 is 50 kHz and that of leg 12 is 45 kHz.

When a signal having a first frequency (50 kHz) is applied to the vibrator 15, leg 11 undergoes resonance and the device is conditioned in a manner wherein the motor moves to the left (viz., in the direction indicated by arrow L) along surface 20. On the other hand, when a second frequency (45 kHz) is applied, the motor is conditioned in a manner wherein it proceeds along the surface 20 in the direction indicated by arrow R (viz., to the right has seen in the drawings).

Although the reasons for this phenomenon is not fully understood it is thought that the mechanism is such that, when the vibrator 15 is energized, the vibrational energy is supplied to both of the legs 11 and 12 which become excited in a manner to vibrate essentially normally to the surface or in the vertical direction as it will be referred to hereinafter. This vertical vibration tends to induce the legs 11 and 12 to float on the surface 20 in manner which tends to reduce the resistance to lateral movement of the unit. When the frequency of the exciting signal coincides with one of the legs, this leg induced to resonate and flex back and forth while the other remains relatively passive.

For example, when a 50 kHz signal is applied, leg 11 tends to renonate with result that leg portion 11a flexes back and forth in a manner which tends to "walk" to the left as shown in FIG. 3A (viz., induce the unit to move in the direction indicated by arrow L). The other leg 12 also tends to undergo a smaller amount of flexure but with a slight difference in phase. Accordingly, this leg 11 tends to "walk" after the resonating one in the manner shown in FIG. 3B. The combination of the movement generates a linear propulsion which acts in the direction of the arrow L.

On the other hand, when a 45 kHz signal is applied to the vibrator 15 the reverse situation occurs wherein leg 12 is induced to resonate and induce the leg portions to flex in the illustrated manner wherein leg 11 walks after the resonating leg 12.

It will be noted that the above described sequence of leg movement is not always reproduced and that sometimes with legs will move toward each other or vice versa. However, the overall effect is such that an eliptical circle is produced and the motor is lead along the surface 20 by the resonating leg. It will also be noted that the amount of flexure of the non-resonating leg is less than that of the resonating one and that for the sake of explanation the amount of flexure has been slightly exaggerated in the drawings simply for the same of explanation.

FIG. 4 shows a second embodiment of the present invention. This arrangement is basically similar to the first embodiment and differs in that the basic element of the motor is arranged to have an essentially A-shape.

Figure 5:
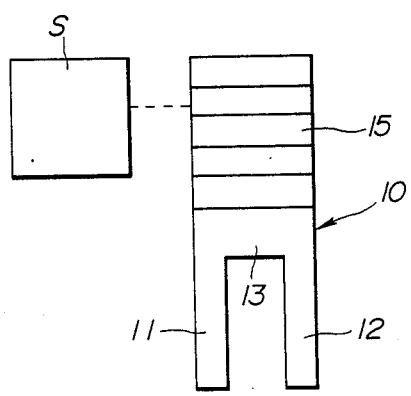

FIG. 5 shows a third embodiment of the present invention wherein the basic element takes the form of an inverted U and wherein the vibrator is secured to the base section of the same. Of course in this instance the resonance frequency of the legs 11 and 12 are arranged to be different in a manner similar to that in the first and second embodiments.

The operation of the second and third embodiments is essentially similar to that of the first one. Accordingly a redundant repetition of the same will be omitted for brevity.

By way of example, suitable dimensions of the first embodiment are such that height h of the H shaped element shown in FIG. 1 is about 10 mm while the width 1 about 20 mm.

A device of the above mentioned size produces sufficient power to automatically draw widow curtains, operate sun visors, move printer heads in printer arrangements and the like.

The various modifications, changes and combinations that can be made using the basic arrangement of the present invention will be fully apparent to those skilled in the art to which the present invention pertains. For example, changes in leg design and or the combination of more than one motor for the purposes of increasing the amount of torque which can be produced, are deemed to be within the perview of the instant invention.

What is claimed is:

1. A linear motor comprising:
    a chassis, said chassis having first and second leg portions, said first leg portion having a first resonance frequency, said second leg portion having a second resonance frequency which is different from the first one;
    a vibrator, said vibration being secured to said chassis in a manner to induce said chassis to vibrate when energized, said vibrator being connected to a control circuit and arranged to selectively vibrate said member at first and second frequencies which correspond to said first and second resonance frequencies.

2. A linear motor as claimed in claim 1 wherein said chassis has an essentially H-shape and comprises:
    two upright members which extends essentially normally to a surface on which the motor is arranged, and a cross-member which interconnects said two upright members, said vibrator being connected between said upright members above said cross-member.

3. A linear motor as claimed in claim 1 wherein said chassis has an essentially inverted U-shape and comprises:
    two upright members which extend essentially normally to a surface on which the motor is arranged, and a cross-member which merges with the upper ends of the two upright members, said vibrator being disposed between said upright members at a level lower than said cross-member.

4. A linear motor as claimed in claim 1 wherein said chassis has an essentially inverted U-shape and comprises:
    two upright members which extend essentially normally to a surface on which the motor is arranged, and a cross-member which merges with the upper ends of the two upright members, said vibrator being disposed on said cross-member.

5. A linear motor as claimed in claim 1 wherein said vibrator comprises:
    a multi-plate piezo device which is compiled by suitably arranging single plate elements.

6. A linear motor as claimed in claim 1 wherein said vibrator comprises:
    an electrostrictive device which is compiled by suitably arranging single plate elements.

7. In a method of producing linear motion
    arranging a first leg of a motor to have a first resonance frequency;
    arranging a second leg of the motor to have a second resonance frequency which is different from said first resonance frequency;
    inducing the motor to produce linear motion in a first direction by applying a vibration having a frequency which coincides with said first resonance; and
    inducing the motor to produce linear motion in second direction by applying vibration having frequency which coincides with said second resonance frequency.

* * * * *